G. W. DE CLEMENTS.
AUTOMOBILE FENDER.
APPLICATION FILED DEC. 15, 1909.
982,577.
Patented Jan. 24, 1911.
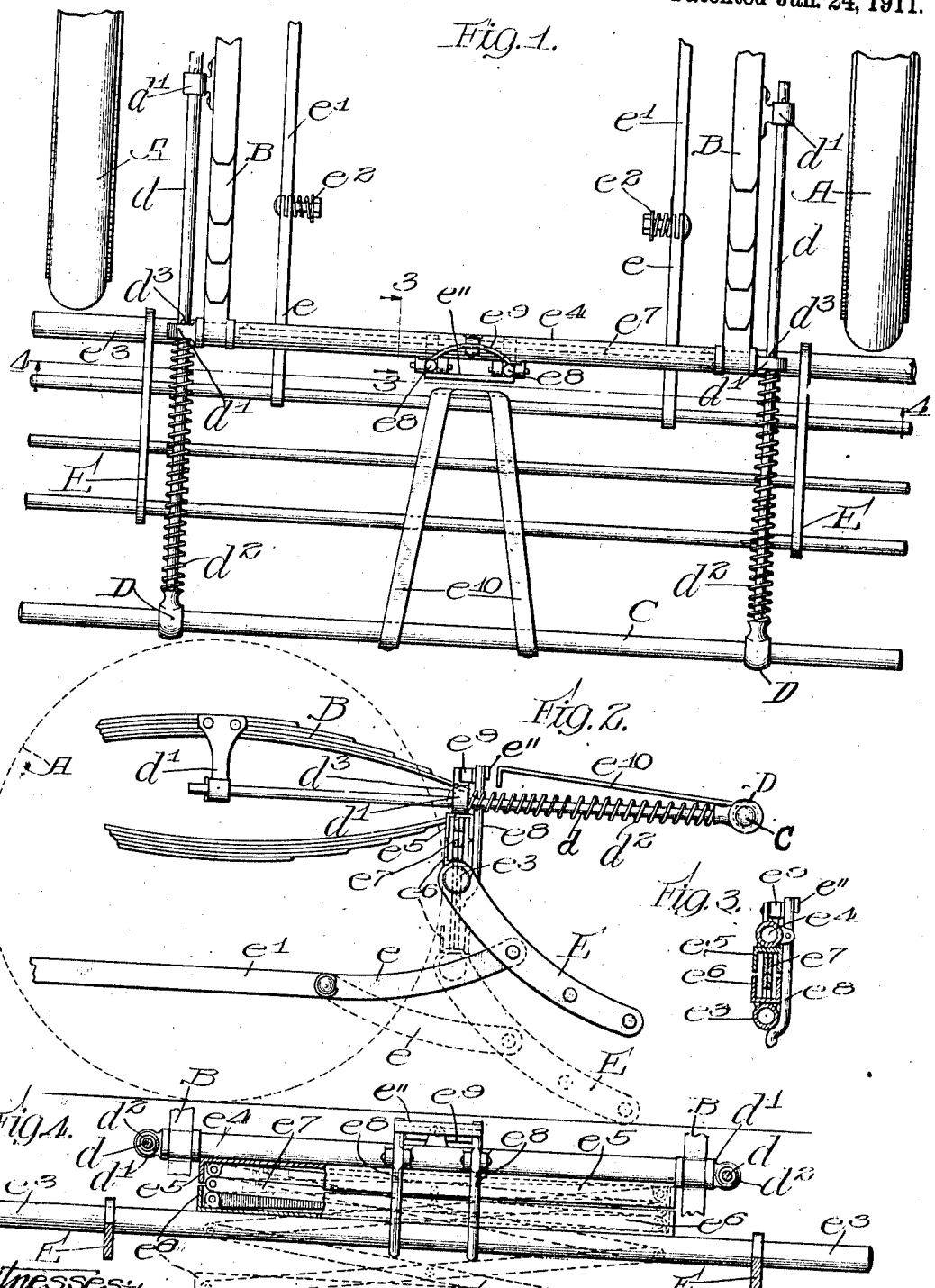

UNITED STATES PATENT OFFICE.

GEORGE W. DE CLEMENTS, OF CHICAGO, ILLINOIS, ASSIGNOR OF ONE-HALF TO CHARLES A. COEY, OF CHICAGO, ILLINOIS.

AUTOMOBILE-FENDER.

982,577.

Specification of Letters Patent.

Patented Jan. 24, 1911.

Application filed December 15, 1909. Serial No. 533,285.

*To all whom it may concern:*

Be it known that I, GEORGE W. DE CLEMENTS, a citizen of the United States of America, and resident of Chicago, Cook county, Illinois, have invented a certain new and useful Improvement in Automobile-Fenders, of which the following is a specification.

My invention contemplates an improved fender for automobiles.

In carrying out my invention, I provide the automobile with a guard which is backed by springs, and which is adapted to act as a bumper, being disposed in position to strike a person standing in the path of the automobile. Below the said bumper, and immediately in front of the steering wheels, I arrange the fender. A catch is provided for holding the fender normally raised from the ground, and the bumper is provided with means for operating the said catch. In this way the fender is automatically released when the bumper strikes a person, and the latter is  ght by the fender and prevented from going under the automobile.

The object of my invention, as thus constructed, is to provide a fender which will not be clumsy or cumbersome, which will not be unsightly, and which will automatically be brought into action when necessity requires, as will hereinafter more fully appear.

To the foregoing and other useful ends, my invention consists in matters hereinafter set forth and claimed.

In the accompanying drawings, Figure 1 is a plan of the forward portions of an automobile, showing the same equipped with a bumper-controlled fender embodying the principles of my invention. Fig. 2 is a side elevation of the parts shown in Fig. 1, the front wheels being shown in dotted lines. Fig. 3 is a detail section on line 3—3 in Fig. 1. Fig. 4 is a vertical section on line 4—4 in Fig. 1.

As thus illustrated, the automobile has the usual front steering wheels A and the springs B. The front guard rail C is carried on the forward ends D of the rods $d$, which latter are mounted in the bearings $d'$ on the sides of the said springs. The springs $d^2$ on said rods tend to keep the guard C pressed forward, the movement in this direction being limited by pins $d^3$ in the rods, which strike against the bearings $d'$. Thus the guard C extends across the front of the automobile in position to act as a bumper.

The fender E is of any suitable form or construction, and as shown is slightly concave on its front or upper side. A pair of links or arms $e$ are pivoted at their front ends to the said fender, in any suitable manner, and at their rear ends to the bars $e'$. Springs $e^2$ are applied to the said links $e$, where they are pivoted to the bars $e'$, and serve to throw the fender downward. The top of the fender has a round bar or pipe $e^3$, and the springs B are connected by a similar bar or pipe $e^4$, the latter above the former. The bar or pipe $e^4$ has a housing $e^5$ on the bottom thereof, and the bar or pipe $e^3$ has a similar housing $e^6$ on the top thereof. These bars or pipes $e^3$ and $e^4$ are connected by a lazy tongs $e^7$ that is disposed within said housings. The hooks or catches $e^8$ are pivoted on the said member $e^4$, and are adapted at their lower ends to engage and hold the said member $e^3$, so as to hold the fender in a raised position. A bow spring $e^9$ is suitably applied to the upper ends of said catches to enable them to hold the fender. A trip $e^{10}$ is secured to the bumper C and extends backward to operate the catches $e^8$, by engaging the cross bar $e^{11}$ on their upper ends, when the bumper is actuated by striking a person or object. This, of course, releases the fender and allows it to fall to the position shown in dotted lines in Fig. 2. When the fender is again raised, the bar $e^3$ thereof strikes the lower ends of the catches $e^8$, and the latter automatically snap into place and hold the fender.

When the fender falls it catches and prevents the person from going under the automobile. The lazy tongs $e^7$ close and obstruct the space over the fender, and hold the upper end of the latter in position. Thus the engine and gearing of the automobile cannot pass over the person, as was heretofore possible.

The fender is not clumsy or cumbersome, and is not unsightly, as it is normally raised and disposed inconspicuously below the bumper.

I do not, of course, limit myself to the exact construction shown and described.

What I claim as my invention is:

1. In combination with an automobile, a movable bumper attached thereto and provided with springs for holding the bumper in normal position, a vertically gravitating fender, vertically swinging links connecting the fender to the automobile frame, a catch for holding the fender in an elevated position, and means operated by the bumper for releasing said catch to permit the fender to gravitate to operative position.

2. In combination with an automobile comprising front steering wheels, an attachment located just in front of said wheels, comprising a movable bumper, a pivoted fender below the bumper, a catch for normally holding the fender raised above the ground, which catch engages the upper and rear edge of the fender, and means by which the bumper operates the said catch to allow the fender to fall to the ground.

3. In combination with an automobile comprising front steering wheels, an attachment located just in front of said wheels, comprising a bodily movable fender, means for holding the fender up, means for releasing the fender, and extensible means for closing or obstructing the space above the fender when the latter falls.

4. In combination with an automobile comprising front steering wheels, an attachment located just in front of said wheels, comprising a fender, means for causing the fender to move downward, and a lazy tongs for closing or obstructing the space above the fender, said lazy tongs being extended when the fender is down, and contracted when the fender is up.

5. In combination with an automobile comprising front steering wheels, an attachment located just in front of said wheels, comprising a fender, arms pivoted to the sides of the fender, supports to which the rear ends of said arms are pivoted, a device engaging the top of said fender to hold it raised from the ground, and means for operating said device to cause the fender to move down.

6. In an automobile, and in combination with the front steering wheels, the steering gear and other essential elements thereof, a fender operable at the front of the machine, means for controlling it, parallel bars under the automobile, and pivoted links connecting the forward ends of said bars with said fender, said links being disposed back of and below the fender.

7. In combination with a motor vehicle, a movable bumper, a bodily gravitating fender thereunder, pivotal links connecting the fender at a point between its upper and lower ends to the motor vehicle frame, an extensible guard connecting the upper end of the fender to the frame of the vehicle, and means operated by the moving of the bumper to release the fender and permit it to fall and said guard to be extended.

8. In combination with a motor vehicle, a gravitating fender connected thereto, an extensible guard connecting the upper end of the fender to the vehicle at a point above the fender, said guard filling in the space above the fender when the fender is up or down, a catch for holding the fender up and the guard contracted, and means on the vehicle for releasing said catch to permit the guard to extend itself and the fender to fall.

9. In combination with a motor vehicle, a gravitating fender, an extensible guard connecting the upper edge thereof to the motor vehicle at a point above, means for releasing the fender and permitting the same to fall and the guard to be extended, a downwardly turned channel housing inclosing the upper edge of the guard, and an upwardly facing channel housing mounted on the fender and inclosing the lower edge of the guard, for the purpose set forth.

Signed by me at Chicago, Illinois, this 13th day of December, 1909.

GEORGE W. DE CLEMENTS.

Witnesses:
ROSE SCHNEUR,
WM. B. DARWIN.